3,642,801
N-SUBSTITUTED 1-(PYRIDYL-2')-1,2,3,4-TETRA-
HYDRO-ISOQUINOLINES AND SALTS
Ernst Seeger, Wolfhard Engel, Helmut Teufel, Hans
Machleidt, Heinrich Ueberberg, and Hanns Ihrig, Biber-
ach an der Riss, Germany, assignors to Boehringer
Ingelheim G.m.b.H., Ingelheim am Rhein, Germany
No Drawing. Filed Feb. 26, 1969, Ser. No. 802,657
Claims priority, application Germany, Feb. 27, 1968,
P 16 95 922.1
Int. Cl. C07d 35/10
U.S. Cl. 260—287 R        4 Claims

ABSTRACT OF THE DISCLOSURE

Compounds of the formula

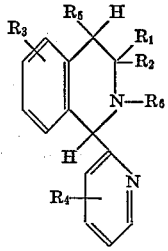

wherein $R_1$ and $R_2$ are each alkyl of 1 to 5 carbon atoms,
$R_3$ is hydrogen, alkyl of 1 to 3 carbon atoms or halogen,
$R_4$ and $R_5$ are each hydrogen or alkyl of 1 to 3 carbon atoms, and
$R_6$ is methyl or formyl, and their non-toxic, pharmacologically acceptable acid addition salts, useful as activators of the liver ferments in warm-blooded animals as indicated by increase in liver weight.

---

This invention relates to novel N-substituted 1-(pyridyl-2')-1,2,3,4-tetrahydro-isoquinolines and acid addition salts thereof, as well as to methods of preparing these compounds.

More particularly, the present invention relates to compounds of the formula

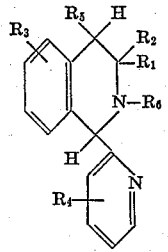

wherein:

$R_1$ and $R_2$, which may be identical to or different from each other, are each alkyl of 1 to 5 carbon atoms,
$R_3$ is hydrogen, alkyl of 1 to 3 carbon atoms or halogen,
$R_4$ and $R_5$, which may be identical to or different from each other, are each hydrogen or alkyl of 1 to 3 carbon atoms, and
$R_6$ is methyl or formyl, and their non-toxic, pharmacologically acceptable acid addition salts.

The compounds of the Formula I above may be prepared by various methods involving known chemical principles, among which the following have proved to be particularly convenient and efficient:

Method A

For the preparation of a compound of the Formula I wherein $R_6$ is formyl, by heating a 1-(pyridyl-2')-3,4-dihydro-isoquinoline of the formula

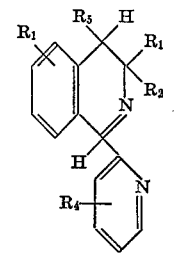

wherein $R_1$ through $R_5$ have the same meanings as in Formula I, for about eight hours with aqueous formic acid, optionally in the presence of a hydrogenation catalyst, such as Raney nickel, or by heating a dihydro-isoquinoline of the Formula II with a mixture of formic acid and formamide for about four to five hours.

Method B

For the preparation of a compound of the Formula I wherein $R_6$ is methyl, by subjecting a dihydro-isoquinoline of the Formula II to catalytic hydrogenation in the presence of formaldehyde, or by heating a dihydro-isoquinoline of the Formula II with formic acid in the presence of paraformaldehyde.

Method C

By reacting a 1 - (pyridyl - 2') - 1,2,3,4-tetrahydro-isoquinoline of the formula

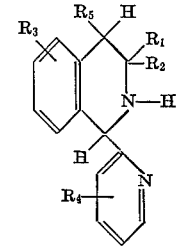

wherein $R_1$ through $R_5$ have the same meanings as in Formula I, with formic acid or a mixed formic acid-carboxylic acid anhydride and, if desired, converting the corresponding N-formyl-tetrahydro-isoquinoline thus obtained into the analogous N-methyl-tetrahydro-isoquinoline pursuant to known methods, for instance, by reduction with a complex metal hydride, such as lithium aluminum hydride. However, the N-methyl substituent may also be directly introduced by reacting a compound of the Formula III with a mixture of paraformaldehyde and formic acid, or with formaldehyde and catalytically activated hydrogen, for instance, in the presence of Raney nickel.

The 1-pyridyl-3,4-dihydro-isoquinolines of the Formula II used as starting materials for Methods A and B may be prepared by the methods described in copending application Ser. No. 531,042, filed Mar. 2, 1966, For instance, a compound of the Formula II may be obtained by reacting a compound of the formula

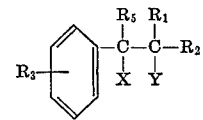

wherein $R_1$, $R_2$, $R_3$ and $R_5$ have the same meanings as in Formula I and X and Y, which must be different from each other, are hydrogen, hydroxyl, hydroxyl esterified with a carboxylic acid or a sulfonic acid, or halogen if one of them is hydrogen, or X and Y together represent a double bond, with a 2-cyanopyridine compound of the formula

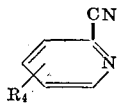

(V)

wherein $R_4$ has the same meanings as in Formula I, or a salt thereof, such as the hydrogen sulfate, at elevated temperatures, especially at a temperature between 70 and 125° C., and in the presence of a cyclization agent, such as sulfuric acid, phosphoric acid, borontrifluoride, methanesulfonic acid, polyphosphoric acid, aromatic sulfonic acids, polyphosphoric acid esters and zinc chloride. The employment of sulfuric acid as a cyclization agent is preferred, however, since it produces by far the best yields.

The reaction is advantageously carried out in the presence of an inert organic solvent or diluent having a relatively high boiling point, such as xylene, o-dichlorobenzene, nitrobenzene, tetrachloroethane, tetrachloroethylene, diphenylether or the like. However, the reaction may also be carried out without a solvent or diluent.

More particularly, the reaction is carried out in the following manner. The cyanopyridine compound or a salt thereof is placed into the reaction vessel and is there admixed with the calculated amount of sulfuric acid or any of the other cyclization agents, accompanied by cooling. Thereafter, the compound of the Formula IV is introduced into the mixture, accompanied by continuous stirring, so that the internal temperature rises to between 70 and 125° C., preferably 85 and 95° C. However, the reaction may also be carried out by first admixing the cyanopyridine compound or a salt thereof with the compound of the Formula IV in the reaction vessel, slightly heating the mixture, and then introducing the sulfuric acid or any of the other cyclization agents, accompanied by continuous stirring, so that the internal temperature rises to beween 70 and 125° C.

If the reaction is performed at temperatures below those indicated above, the product is a mixture of dihydroisoquinolines with varying amounts of N-substituted pyridine carboxylic acid amides.

The carbinol starting compounds embraced by Formula IV, to the extent that they are not specifically described in the literature, may be prepared according to well known methods; for instance, by reacting the corresponding ketones, or in some cases the corresponding aldehydes, with a suitable Grignard reagent. In the carbinols the hydroxyl group may be exchanged for a halogen atom; for instance, by treating the carbinol with a hydrogen halide, phosphorus halide or the like. Thus, good yields of 2-methyl-2-chloro-1-phenyl-propane (B.P. 86–89° C. at 10 mm. Hg) may be obtained from 2-methyl-1-phenyl-propanol-(2).

The styrolene compounds embraced by Formula V, i.e. those wherein X and Y together represent a double bond, to the extent that they are not specifically described in the literature, may be prepared in customary fashion by treating a corresponding carbinol with a dehydrating agent; for instance, β,β-dimethylstyrolene (B.P. 69–70° C. at 12 mm. Hg) may be obtained in this manner from 2-methyl-1-phenylpropanol-(2).

The 1-pyridyl-1,2,3,4-tetrahydro-isoquinolines of the Formula III used as starting materials in Method C may be prepared by the method described in copending application Ser. No. 710,744, filed Mar. 6, 1968, that is, by reducing a 1-(pyridyl-2')-2-hydroxy-1,2,3,4-tetrahydro-isoquinoline of the formula

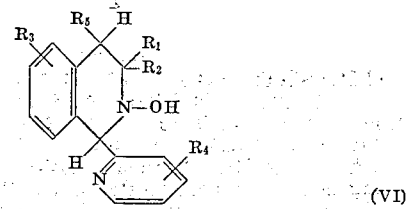

(VI)

wherein $R_1$, $R_2$, $R_3$, $R_4$ and $R_5$ have the same meanings as in Formula I, with (1) hydrogen in the presence of a hydrogenation catalyst, or (2) nascent hydrogen, or (3) a complex metal hydride.

Hydrogenation catalysts suitable for the catalytic hydrogenation are the customary metal catalysts, such as Raney nickel or copper chromium oxide. The hydrogenation is carried out at elevated pressure, such as between 50 and 200 atmospheres and preferably between 100 and 150 atmospheres, at moderately elevated temperatures and in the presence of an organic solvent which is inert under the reaction conditions, such as a lower alkanol, preferably ethanol or methanol.

The nascent hydrogen may be generated pursuant to customary methods, that is, by treating a metal such as tin with a mineral acid such as hydrochloric acid.

The reduction with a complex metal hydride is carried out in customary fashion and in the presence of a suitable inert organic solvent, such as ether, tetrahydrofuran or a lower alkanol, particularly methanol, ethanol or the like. Suitable complex metal hydrides are lithium aluminum hydride, sodium borohydride or the like.

The compounds of the Formula VI, in turn, may be prepared by subjecting a pyridine aldoxime of the formula

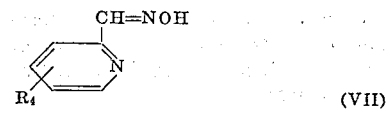

(VII)

wherein $R_4$ has the same meaning as in Formula I, to cyclization reaction with a compound of the formula

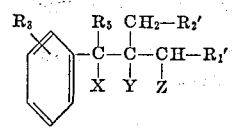

(VIII)

wherein $R_1'$ and $R_2'$, which may be identical to or different from each other, are hydrogen or alkyl of 1 to 2 carbon atoms, and $R_3$ and $R_5$ have the same meanings as in Formula I, and one of X and Y is hydroxyl, esterified hydroxyl, such as acetoxy, or halogen while the other and Z are hydrogen, or Y together with X or Z represents a double bond, in the presence of a strong acid or a Lewis acid.

The compounds defined by Formula I are organic bases and therefore form acid addition salts with inorganic or organic acids. Examples of non-toxic, pharmacologically acceptable acid addition salts are those formed with hydrochloric acid, hydrobromic acid, sulfuric acid, phosphoric acid, succinic acid, tartaric acid, citric acid, adipic acid, maleic acid, fumaric acid, 8-chlorotheophylline or the like. Such acid addition salts may be prepared by conventional methods, that is, for instance, by dissolving the free base in a suitable solvent and acidifying the solution with the desired inorganic or organic acid.

The following examples further illustrate the present invention and will enable others skilled in the art to understand it more completely. It should be understood, however, that the invention is not limited solely to the particular examples given below.

EXAMPLE 1

Preparation of 1-(pyridyl-2')-2-formyl-3,3-dimethyl-1,2,3,4-tetrahydro-isoquinoline by method A 5 gm. of 1-(pyridyl-2')-3,3-dimethyl-3,4-dihydro-isoquinoline were dissolved in 75 cc. of aqueous 75% formic acid, 5 gm. of Raney nickel were added to the solution, and the mixture was refluxed for eight hours. Thereafter, the reaction mixture was allowed to cool, was then vacuum filtered, and the filtrate was made alkaline with ammonia and extracted with ether. The ethereal extract solution was dried with sodium sulfate, and the ether was evaporated. The residue was briefly boiled with about 50 cc. of petroleum ether, and the mixture was filtered while still hot. The filter cake was recrystallized from ethyl acetate, yielding 2.5 gm. of 1-(pyridyl-2')-2-formyl-3,3-dimethyl-1,2,3,4-tetrahydro-isoquinoline, M.P. 104–106° C., of the formula

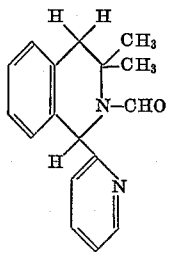

EXAMPLE 2

Preparation of 1-(pyridyl-2')-2-formyl-3,3-diethyl-1,2,3,4-tetrahydro-isoquinoline by method A 10 gm. of 1-(pyridyl-2')-3,3-diethyl-3,4-dihydro-isoquinoline were added to a mixture consisting of 40 cc. of 100% formic acid and 120 cc. of formamide, and the mixture was heated for five hours on an oil bath at 150° C. Thereafter, the reaction mixture was allowed to cool and then poured into water, the aqueous solution was made alkaline with sodium hydroxide, and the oil precipitated thereby was extracted with ether. The ether extract solution was dried with sodium sulfate, the ether was distilled off, and the oily residue was fractionally distilled in vacuo. The oily fraction passing over at 178° C. and 0.2 mm. Hg solidified upon standing and was recrystallized from petroleum ether. 7 gm. of 1-(pyridyl-2')-2-formyl-3,3-diethyl-1,2,3,4-tetrahydro-isoquinoline, M.P. 107° C., of the formula

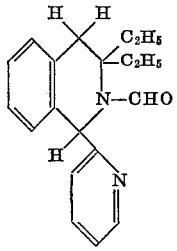

were obtained.

Its hydrochloride had a melting point of 197° C.

EXAMPLE 3

Using a procedure analogous to that described in Example 2, 1-(pyridyl-2')-2-formyl-3,3-dimethyl-1,2,3,4-tetrahydro-isoquinoline, M.P. 104–106° C., was prepared from 1-(pyridyl-2')-3,3-dimethyl-3,4-dihydro-isoquinoline hydrochloride (M.P. 197–198° C.).

EXAMPLE 4

Preparation of 1-(pyridyl-2')-2-methyl-3,3-diethyl-1,2,3,4-tetrahydro-isoquinoline by method C 1.8 gm. of paraformaldehyde were dissolved in 6 gm. of aqueous 98% formic acid by warming on a water bath, and then, while vigorously stirring, 4 gm. of 1-(pyridyl-2')-3,3-diethyl-1,2,3,4-tetrahydro-isoquinoline were added to the solution. The mixture was heated at 70–80° C. for 15 minutes and thereafter stirred into water, and the aqueous solution was neutralized with sodium carbonate and extracted with chloroform. The chloroform extract solution was evaporated, leaving an initially oily residue which solidified into a crystalline mass after standing for some time. The crystalline mass was recrystallized from ethyl acetate, yielding 3.5 gm. of 1-(pyridyl - 2')-2-methyl-3,3-diethyl-1,2,3,4-tetrahydro-isoquinoline, M.P. 121° C., of the formula

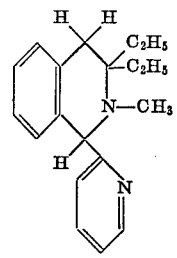

Its dihydrochloride had a melting point of 204° C. (decomp.).

EXAMPLE 5

1-(pyridyl-2')-2-methyl-3,3-diethyl-1,2,3,4-tetrahydro-isoquinoline 17.6 gm. of 1-(pyridyl-2')-2-formyl-3,3-diethyl-1,2,3,4-tetrahydro-isoquinoline were dissolved in 200 cc. of tetrahydrofuran, and the resulting solution was added dropwise to a suspension of 4.6 gm. of lithium aluminum hydride in 100 cc. of tetrahydrofuran, while stirring. Thereafter, the reaction mixture was refluxed for six hours and then poured into ice water. The aqueous mixture was made acid with aqueous 50% sulfuric acid, and the resulting acid aqueous solution was made alkaline with aqueous 40% sodium hydroxide. The alkaline mixture was then extracted several times with ether, the combined ethereal extracts were washed with water and then dried over sodium sulfate, and the ether was distilled off. The residue was recrystallized from ethyl acetate, yielding 9.5 gm. of 1-(pyridyl-2')-2-methyl - 3,3 - diethyl-1,2,3,4-tetrahydro-isoquinoline, M.P. 121° C. Its dihydrochloride had a melting point of 204° C. (decomp.).

EXAMPLE 6

Preparation of 1-(pyridyl-2')-2,3,4-trimethyl-1,2,3,4-tetrahydro-isoquinoline by method C A solution of 5.3 gm. of 1-(pyridyl-2')-2-formyl-3,3-dimethyl-1,2,3,4-tetrahydro - isoquinoline (M.P. 104° C.) in 100 cc. of tetrahydrofuran was added dropwise to a suspension of 1.52 gm. of lithium aluminum hydride in 50 cc. of tetrahydrofuran, while stirring, and then the reaction mixture was heated for two hours at about 70° C. Thereafter, the reaction mixture was allowed to cool and was then poured over ice, the aqueous mixture was made acid with aqueous 50% sulfuric acid, sodium hydroxide was added until alkaline reaction, and the alkaline aqueous mixture was extracted with ether. The ethereal extract solution was washed neutral with water, and the ether was evaporated. The oily residue was fractionally distilled in vacuo; the fraction passing over between 135–140° C. at 0.1 mm. Hg was identified to be 1-(pyridyl-2')-2,3,4-trimethyl-1,2,3,4-tetrahydroisoquinoline. Its dihydrochloride had a melting point of 196–198° C.

EXAMPLE 7

Preparation of 1-(pyridyl-2')-2-formyl-3,3-diethyl-1,2,3,4-tetrahydro-isoquinoline by method C A mixture consisting of 5 gm. of 1-(pyridyl-2')-3,3-diethyl-1,2,3,4-tetrahydro-isoquinoline and 15 cc. of aqueous 85% formic acid was heated for eight hours on an oil bath at 150–160° C., while stirring. Thereafter, the reaction mixture was poured into about 200 cc. of water, the aqueous solution was made alkaline with ammonia, and the colorless precipitated formed thereby was separated by vacuum filtration. 5 gm. of 1-(pyridyl-2')-2-formyl-3,3-diethyl - 1,2,3,4 - tetrahydro-isoquinoline were obtained which, after recrystallization from petroleum ether, had a melting point of 107° C.

The compounds according to the present invention, that is, those embraced by Formula I and their non-toxic, pharmacologically acceptable acid addition salts, have useful pharmacodynamic properties. More particularly, they have an activating effect upon the ferments or enzymes of the liver in warm-blooded animals, such as rats.

The liver ferment activating property of the compounds according to the present invention was ascertained by means of a standard pharmacological test, namely, the shortening effect upon barbiturate sleep in rats.

A group of ten adult laboratory rats were administered 75 mgm./kg. of hexobarbital intraperitoneally, and the average duration of sleep (suspension of the righting reflex) was determined for the group. Thereafter, another group of ten test animals were given 7.5 mgm./kg. of the compound under investigation per os, and 24 hours later 75 mgm./kg. of hexobarbital were administered intraperitoneally. The average duration of sleep was again determined, and the reduction in the duration of hexobarbital sleep, if any, was expressed in terms of percent. The following results were obtained:

TABLE I

| Compound | Dose per os, mgm./kg. | Reduction in duration of hexobarbital sleep, percent |
|---|---|---|
| 2-formyl-3,3-diethyl-1-(pyridyl-2')-1,2,3,4-tetrahydro-isoquinoline.HCl | 7.5 | 67.4 |
| 2-formyl-3,3-dimethyl-1-(pyridyl-2')-1,2,3,4-tetrahydro-isoquinoline.HCl | 7.5 | 61.0 |

The acute toxicity of these compounds was determined on groups of 10 male white mice having an average body weight of 20–25 gm. The $LD_{50}$, that is, the peroral dose which causes 50% of the animals to die within 48 hours, was calculated from the raw data by the method of Litchfield and Wilcoxon. The following results were obtained:

TABLE II

Compound: $LD_{50}$, mgm./kg.

2 - formyl - 3,3 - diethyl-1-(pyridyl-2')-1,2,3,4-tetrahydro-isoquinoline·HCl _____ 1700
2 - formyl - 3,3 - dimethyl - 1 - (pyridyl-2')-1,2,3,4-tetrahydro-isoquinoline·HCl _____ 1100

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.41 to 5.0 mgm./kg. body weight, preferably 0.83 to 4.2 mgm./kg.

The following examples illustrate a few dosage unit compositions comprising a compound of the instant invention as an active ingredient and represent the best mode contemplated of putting the invention to practical use. The parts are parts by weight unless otherwise specified.

EXAMPLE 8

Tablets

The tablet composition was compounded from the following ingredients:

| | Parts |
|---|---|
| 2 - formyl - 3,3 - diethyl - 1 - (pyridyl-2')-1,2,3,4-tetrahydro-isoquinoline hydrochloride | 150.0 |
| Colloidal silicic acid | 100.0 |
| Lactose | 240.0 |
| Potato starch | 100.0 |
| Tartaric acid | 5.0 |
| Magnesium stearate | 5.0 |
| Total | 600.0 |

Compounding procedure

The isoquinoline compound was admixed with the colloidal silicic acid, the lactose and one-half of the indicated amount of potato starch, the mixture was moistened with an aqueous 3.5% solution of the tartaric acid, the moist mass was forced through a 1.5 mm.-mesh screen, the moist granulate obtained thereby was dried at 45° C., and the dry granulate was again passed through the screen and was then admixed with the remainder of the potato starch and with the magnesium stearate. The finished composition was pressed into 600 mgm.-tablets. Each tablet contained 150 mgm. of the isoquinoline compound and, when administered perorally to a warm-blooded animal of about 60 kg. body weight in need of such treatment, produced very good liver ferment activating effects.

EXAMPLE 9

Coated pills

The pill core composition was compounded from the following ingredients:

| | Parts |
|---|---|
| 2 - formyl - 3,3 - dimethyl - 1 - (pyridyl-2')-1,2,3,4-tetrahydro-isoquinoline hydrochloride | 25.0 |
| Colloidal silicic acid | 15.0 |
| Lactose | 63.0 |
| Potato starch | 15.0 |
| Tartaric acid | 1.0 |
| Magnesium stearate | 1.0 |
| Total | 120.0 |

Compounding procedure

The individual ingredients were admixed and the mixture granulated in a manner analogous to that described in Example 8, and the finished composition was pressed into 120 mgm.-pill cores, which were subsequently coated with a thin shell consisting essentially of sugar and talcum, and polished with beeswax. Each coated pill contained 25 mgm. of the isoquinoline compound and, when administered perorally to a warm-blooded animal of about 60 kg. body weight in need of such treatment, produced very good liver ferment activating effects.

EXAMPLE 10

Hypodermic solution

The solution was compounded from the following ingredients:

| | Parts |
|---|---|
| 2,3,3 - trimethyl - 1 - (pyridyl-2')-1,2,3,4-tetrahydro-isoquinoline hydrochloride | 50.0 |
| Citric acid·$H_2O$ | 14.0 |
| Secondary sodium phosphate·$2H_2O$ | 6.0 |
| Distilled water (by vol.) q.s. a.d. | 2000.0 |

Compounding procedure

The citric acid, the sodium phosphate and the isoquinoline compound were dissolved in a sufficient amount of distilled water, the solution was diluted to the indicated volume with additional distilled water, and the dilute solution was filtered until free from suspended particles. The filtrate was filled into brown 2 cc. ampules, which were sealed and then sterilized for 30 minutes at 100° C. Each ampule contained 50 mgm. of the isoquinoline compound, and when the contents thereof were administered intravenously to a warm-blooded animal of about 60 kg. body weight in need of such treatment, very good liver ferment activating effects were produced.

EXAMPLE 11

Suppositories

The suppository composition was compounded from the following ingredients:

|  | Parts |
|---|---|
| 3,3 - diethyl - 2 - formyl - 1 - (pyridyl-2')-1,2,3,4-tetrahydro-isoquinoline hydrochloride | 100.0 |
| Cocoa butter | 1630.0 |
| Total | 1730.0 |

Compounding procedure

The isoquinoline compound, in finely pulverized form, was stirred with the aid of an immersion homogenizer into the cocoa butter which had previously been melted and cooled to 40° C. The mixture was poured into cooled suppository molds, each holding 1730 mgm. of the mixture. One suppository contained 100 mgm. of the isoquinoline compound and, when administered by the rectal route to a warm-blooded animal of about 60 kg. body weight in need of such treatment, produced very good liver ferment activating effects.

Analogous results were obtained when an equal amount of any one of the other compounds embraced by Formula I above or a non-toxic acid addition salt thereof was substituted for the particular isoquinoline compounds in Examples 8 to 11. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:
1. A compound of the formula

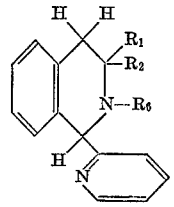

wherein
$R_1$ and $R_2$ are each methyl or ethyl, and
$R_6$ is methyl or formyl,
or a non-toxic, pharmacologically acceptable acid addition salt thereof.

2. A compound according to claim 1, wherein $R_1$ and $R_2$ are ethyl and $R_6$ is formyl.

3. A compound according to claim 1, wherein $R_1$ and $R_2$ are methyl and $R_6$ is formyl.

4. A compound according to claim 1, wherein $R_1$ and $R_2$ are ethyl and $R_6$ is methyl.

References Cited

UNITED STATES PATENTS

| 3,133,926 | 5/1964 | Kuehne | 260—288 |
| 3,457,265 | 7/1969 | Seeger et al. | 260—288 |
| 3,544,577 | 12/1970 | Seeger | 260—288 |

FOREIGN PATENTS

| 1,527,576 | 5/1968 | France | 260—288 |
| 1,529,059 | 6/1968 | France | 260—288 |

OTHER REFERENCES

Silvestrin, et al.: Biochem. Pharmac. vol. 15, pp. 249–54 (1966).

DONALD G. DAUS, Primary Examiner

U.S. Cl. X.R.

260—283 SY, 288 R, 286 R; 424—258

Disclaimer 3,642,801.—*Ernst Seeger, Wolfhard Engel, Helmut Teufel, Hans Machleidt, Heinrich Ueberberg,* and *Hanns Ihrig,* Biberach an der Riss, Germany. N-SUBSTITUTED 1-(PYRIDYL-2') - 1,2,3,4 - TETRAHYDROISOQUINOLINES AND SALTS. Patent dated Feb. 15, 1972. Disclaimer filed Apr. 8, 1971, by the assignee, *Boehringer Ingelheim G.m.b.H.*

Hereby disclaims that portion of the term of the patent subsequent to July 22, 1986.

[*Official Gazette September 12, 1972*]